(12) United States Patent
Stegmaier et al.

(10) Patent No.: US 10,869,513 B2
(45) Date of Patent: Dec. 22, 2020

(54) STABBING-PROOF COMPOSITE STRUCTURE, METHOD OF MANUFACTURING A COMPOSITE STRUCTURE, STABBING-PROOF INSERT, AND PROTECTIVE TEXTILE

(71) Applicants: Deutsche Institute für Textil-und Faserforschung Denkendorf, Denkendorf (DE); W + R GmbH, Metzingen (DE)

(72) Inventors: Thomas Stegmaier, Owen (DE); Andreas Scherrieble, Ludwigsburg (DE); Hannes Junger, Metzingen (DE)

(73) Assignees: Deutsche Institute für Textil-und Faserforschung Denkendorf, Denkendorf (DE); W + R GmbH, Metzingen (DE)

( * ) Notice: Subject to any disclaimer, the term of this patent is extended or adjusted under 35 U.S.C. 154(b) by 149 days.

(21) Appl. No.: 15/999,602

(22) PCT Filed: Feb. 20, 2017

(86) PCT No.: PCT/EP2017/053793
§ 371 (c)(1),
(2) Date: Aug. 17, 2018

(87) PCT Pub. No.: WO2017/140908
PCT Pub. Date: Aug. 24, 2017

(65) Prior Publication Data
US 2019/0191798 A1 Jun. 27, 2019

(30) Foreign Application Priority Data

Feb. 18, 2016 (DE) .......................... 10 2016 202 546

(51) Int. Cl.
*A41D 31/24* (2019.01)
*A41D 19/015* (2006.01)
(Continued)

(52) U.S. Cl.
CPC ... *A41D 19/0096* (2013.01); *A41D 19/01505* (2013.01); *A41D 31/24* (2019.02);
(Continued)

(58) Field of Classification Search
None
See application file for complete search history.

(56) References Cited

U.S. PATENT DOCUMENTS 3,563,836 A * 2/1971 Dunbar ................. F41H 5/0492
428/44
4,648,136 A * 3/1987 Higuchi .................... F41H 1/02
2/2.5
(Continued)

FOREIGN PATENT DOCUMENTS

CN 1398342 A 2/2003
DE 2659727 A1 * 7/1978 ............... B32B 7/12
(Continued)

OTHER PUBLICATIONS

The First Office Action dated Dec. 3, 2019, of counterpart Chinese Application No. 201780012144.0, along with an English translation.

(Continued)

*Primary Examiner* — Jeffrey A Vonch
(74) *Attorney, Agent, or Firm* — DLA Piper LLP (US)

(57) ABSTRACT

A composite structure for stab protection includes layers of flat structures placed on top of each other, and an embedding material, wherein, in at least some of the layers placed on top of each other, the flat structures of adjacent layers are offset relative to one another, the flat structures of the composite structure are at least partially embedded in the embedding material, and the composite structure includes separated connecting elements, wherein before they are separated, the separated connecting elements have connected at least some of the flat structures of adjacent layers with one another.

23 Claims, 1 Drawing Sheet

(51) Int. Cl.
| | |
|---|---|
| *B32B 3/22* | (2006.01) |
| *B32B 3/30* | (2006.01) |
| *B32B 25/04* | (2006.01) |
| *F41H 5/04* | (2006.01) |
| *F41H 1/02* | (2006.01) |
| *B29C 64/188* | (2017.01) |
| *B29C 41/20* | (2006.01) |
| *B29C 70/68* | (2006.01) |
| *B29C 70/70* | (2006.01) |
| *A41D 19/00* | (2006.01) |
| *B32B 3/26* | (2006.01) |
| *B32B 25/14* | (2006.01) |
| *B33Y 80/00* | (2015.01) |
| *B33Y 10/00* | (2015.01) |
| *B29C 71/00* | (2006.01) |
| *B29C 41/22* | (2006.01) |
| *B29C 69/00* | (2006.01) |
| *B29C 64/10* | (2017.01) |
| *B29K 703/00* | (2006.01) |
| *B29K 709/02* | (2006.01) |
| *B29L 9/00* | (2006.01) |
| *B29D 99/00* | (2010.01) |
| *B29K 221/00* | (2006.01) |
| *B29K 701/00* | (2006.01) |
| *B29K 709/00* | (2006.01) |
| *B29L 31/00* | (2006.01) |
| *B29K 705/00* | (2006.01) |

(52) U.S. Cl.
CPC ............ *A41D 31/245* (2019.02); *B29C 41/20* (2013.01); *B29C 64/188* (2017.08); *B29C 70/70* (2013.01); *B32B 3/22* (2013.01); *B32B 3/26* (2013.01); *B32B 3/30* (2013.01); *B32B 25/04* (2013.01); *B32B 25/14* (2013.01); *F41H 5/0414* (2013.01); *F41H 5/0428* (2013.01); *F41H 5/0442* (2013.01); *F41H 5/0492* (2013.01); *A41D 2500/50* (2013.01); *A41D 2500/52* (2013.01); *B29C 41/22* (2013.01); *B29C 64/10* (2017.08); *B29C 69/00* (2013.01); *B29C 70/688* (2013.01); *B29C 71/00* (2013.01); *B29C 2793/009* (2013.01); *B29D 99/0064* (2013.01); *B29D 99/0067* (2013.01); *B29K 2221/00* (2013.01); *B29K 2221/003* (2013.01); *B29K 2221/006* (2013.01); *B29K 2701/00* (2013.01); *B29K 2703/00* (2013.01); *B29K 2705/00* (2013.01); *B29K 2709/02* (2013.01); *B29K 2709/14* (2013.01); *B29K 2995/0037* (2013.01); *B29L 2009/00* (2013.01); *B29L 2031/768* (2013.01); *B32B 2260/02* (2013.01); *B32B 2260/021* (2013.01); *B32B 2260/048* (2013.01); *B32B 2305/07* (2013.01); *B32B 2305/34* (2013.01); *B32B 2305/38* (2013.01); *B32B 2307/51* (2013.01); *B32B 2307/581* (2013.01); *B32B 2437/00* (2013.01); *B32B 2437/02* (2013.01); *B33Y 10/00* (2014.12); *B33Y 80/00* (2014.12); *F41H 1/02* (2013.01); *F41H 5/0457* (2013.01); *Y10S 428/911* (2013.01); *Y10T 428/24174* (2015.01); *Y10T 428/24331* (2015.01); *Y10T 428/24339* (2015.01); *Y10T 428/24347* (2015.01); *Y10T 428/24479* (2015.01); *Y10T 428/24752* (2015.01)

(56) References Cited

U.S. PATENT DOCUMENTS

| | | | | |
|---|---|---|---|---|
| 5,200,263 | A | * | 4/1993 | Gould ............... A41D 19/0058 428/323 |
| 5,368,930 | A | * | 11/1994 | Samples ................ B29C 41/14 428/323 |
| 5,407,612 | A | * | 4/1995 | Gould .................... B29C 41/14 264/496 |
| 5,515,541 | A | * | 5/1996 | Sacks ..................... F41H 5/023 2/2.5 |
| 5,601,895 | A | * | 2/1997 | Cunningham ........... B32B 3/18 428/66.6 |
| 5,853,863 | A | * | 12/1998 | Kim ..................... A61B 42/10 428/223 |
| 5,880,042 | A | | 3/1999 | Schuster et al. |
| 5,906,873 | A | * | 5/1999 | Kim .................. A41D 19/0058 428/57 |
| 6,035,438 | A | * | 3/2000 | Neal ........................ B32B 3/06 2/2.5 |
| 6,159,590 | A | * | 12/2000 | Kim ...................... F41H 5/023 428/223 |
| 6,170,378 | B1 | * | 1/2001 | Neal ..................... F41H 5/0492 156/256 |
| 6,189,157 | B1 | * | 2/2001 | Ziegler ................. F41H 5/0492 2/455 |
| 6,656,570 | B1 | | 12/2003 | Fels et al. |
| 6,962,739 | B1 | | 11/2005 | Kim et al. |
| 7,261,945 | B2 | * | 8/2007 | Biermann ............... B32B 15/04 428/469 |
| 8,105,510 | B1 | * | 1/2012 | Martin .................. F41H 5/0428 156/89.11 |
| 8,354,170 | B1 | * | 1/2013 | Henry .................... B29C 70/26 428/457 |
| 8,490,213 | B2 | * | 7/2013 | Neal .................... A41D 31/285 2/2.5 |
| 9,211,690 | B1 | * | 12/2015 | McKnight ................ B32B 3/14 |
| 2002/0122927 | A1 | * | 9/2002 | Howland .............. F41H 5/0492 428/292.1 |
| 2003/0110932 | A1 | * | 6/2003 | Mohr .................... F41H 5/0428 89/36.02 |
| 2003/0180540 | A1 | * | 9/2003 | O'Connor ............... B29C 43/08 428/411.1 |
| 2004/0031079 | A1 | * | 2/2004 | Horvath ................. A41D 31/24 2/2.5 |
| 2005/0005762 | A1 | * | 1/2005 | Lujan ..................... F41H 5/0442 89/36.02 |
| 2005/0009429 | A1 | * | 1/2005 | Park .......................... B32B 3/10 442/181 |
| 2005/0170221 | A1 | * | 8/2005 | Kim ...................... F41H 5/0492 428/53 |
| 2008/0289087 | A1 | * | 11/2008 | Sundnes ................. B32B 5/026 2/456 |
| 2009/0114083 | A1 | * | 5/2009 | Moore, III ............ F41H 5/0492 89/36.02 |
| 2010/0071537 | A1 | * | 3/2010 | Weber ................... F41H 5/0492 89/36.02 |
| 2014/0150154 | A1 | * | 6/2014 | Aquino ..................... F41H 1/02 2/2.5 |
| 2014/0212625 | A1 | * | 7/2014 | Seitz ...................... B32B 27/22 428/138 |
| 2014/0259324 | A1 | | 9/2014 | Behrend et al. |
| 2016/0327113 | A1 | * | 11/2016 | Shelley .................. G02C 5/008 |
| 2017/0115098 | A1 | * | 4/2017 | Howland .................. B32B 5/26 |
| 2017/0165790 | A1 | * | 6/2017 | McCarthy ............ B23K 26/342 |
| 2018/0326698 | A1 | * | 11/2018 | Geva .................. B32B 37/0076 |

FOREIGN PATENT DOCUMENTS

| | | | | |
|---|---|---|---|---|
| DE | | 2815582 A1 | * 3/1980 | .......... F41H 5/0492 |
| DE | | 42 14 543 A1 | 11/1993 | |
| DE | | 44 07 180 C1 | 4/1995 | |
| DE | | 4407180 C1 | * 4/1995 | .......... F41H 5/0442 |
| DE | | 44 13 969 A1 | 10/1995 | |
| DE | | 19707375 A1 | * 8/1998 | .......... A41D 31/245 |

(56) References Cited

FOREIGN PATENT DOCUMENTS

| | | | | |
|---|---|---|---|---|
| DE | 29815397 U1 * | 12/1998 | ........... | F41H 5/0457 |
| DE | 198 02 242 A1 | 8/1999 | | |
| DE | 198 19 737 A1 | 11/1999 | | |
| DE | 198 33 816 A1 | 3/2000 | | |
| DE | 19844051 A1 * | 3/2000 | ............ | A41D 31/24 |
| DE | 200 07 820 U1 | 9/2000 | | |
| DE | 202004018209 U1 * | 1/2005 | ........... | A41D 13/043 |
| EP | 0611943 A1 * | 8/1994 | ........... | F41H 5/0492 |
| EP | 1190647 A2 * | 3/2002 | ............ | A47C 7/26 |
| EP | 1 238 595 A2 | 9/2002 | | |
| EP | 1 787 537 A2 | 5/2007 | | |
| EP | 2327949 A1 * | 6/2011 | ............... | A47C 7/26 |
| FR | 1581760 A * | 9/1969 | ............... | F41H 5/0428 |
| FR | 2692649 A1 * | 12/1993 | ............ | A41D 31/24 |
| FR | 2 808 975 A | 11/2001 | | |
| GB | 425066 A * | 3/1935 | ........... | F41H 5/0442 |
| GB | 915345 A * | 1/1963 | ........... | F41H 5/0457 |
| GB | 2273312 A * | 6/1994 | ........... | A44B 17/0029 |
| GB | 2283902 A * | 5/1995 | ........... | B32B 15/043 |
| GB | 2287639 A * | 9/1995 | ............ | F41H 5/023 |
| GB | 2302794 A * | 2/1997 | ........... | A41D 31/245 |
| GB | 2433192 A * | 6/2007 | ........... | F41H 5/0492 |
| JP | 2001012899 A * | 1/2001 | ........... | F41H 5/0492 |
| JP | 2005-069672 A | 3/2005 | | |
| JP | 2006343091 A * | 12/2006 | | |
| RU | 2256144 C1 * | 7/2005 | | |
| WO | WO-8806413 A1 * | 9/1988 | ........... | A41D 31/245 |
| WO | WO-9213250 A1 * | 8/1992 | ............... | F41H 1/02 |
| WO | WO-9216813 A1 * | 10/1992 | ........... | F41H 5/0492 |
| WO | WO-9321492 A1 * | 10/1993 | ........... | A41D 31/245 |
| WO | 94/15491 A1 | 7/1994 | | |
| WO | WO-9507033 A1 * | 3/1995 | ............ | F41H 5/023 |
| WO | 96/03277 A1 | 2/1996 | | |
| WO | WO-9939153 A1 * | 8/1999 | ........... | A41D 31/245 |
| WO | WO-0005983 A2 * | 2/2000 | ........... | F41H 5/0492 |
| WO | WO-2006068721 A2 * | 6/2006 | ........... | F41H 5/0492 |
| WO | 2008/080611 A2 | 7/2008 | | |
| WO | WO-2008080611 A2 * | 7/2008 | ........... | F41H 5/0428 |
| WO | 2012/166624 A1 | 12/2012 | | |

OTHER PUBLICATIONS

German Examination Report dated Jan. 18, 2017, of corresponding DE Application No. 10 2016 202 546.5.
The Second Office Action dated Aug. 24, 2020, of counterpart Chinese Application No. 201780012144.0, along with an English translation.

* cited by examiner

STABBING-PROOF COMPOSITE STRUCTURE, METHOD OF MANUFACTURING A COMPOSITE STRUCTURE, STABBING-PROOF INSERT, AND PROTECTIVE TEXTILE

TECHNICAL FIELD

This disclosure relates to a composite structure for stab protection, a method of producing such a composite structure, a stab-resistant insert, a protective textile, and use of a composite structure as a stab-resistant insert and producing a protective textile.

BACKGROUND

Stab protection is known. For example, DE 4413969 A1 discloses stab protection for the body with a plurality of layers of thin, flexible metal films.

Protective body armor suitable in particular for stab protection is disclosed in EP 1238595 A2 and EP 1787537 A2. The respective body armor is composed of at least two flat structures connected to one another to allow adaptation to the body while forming gap openings by joints, wherein closure elements are provided to close the gap openings.

WO 2008/080611 A2 discloses protective body armor composed of a plurality of conical, truncated conical, pyramidal and/or truncated pyramidal armor elements. The armor elements can form a multilayer matrix assembly, wherein the armor elements of a first layer and the armor elements of a second layer are offset relative to one another with a gap in between.

A protective textile for protection against wounds caused by stabbing devices, cutting devices, projectiles or shrapnel is known from WO 96/03277 A1. The protective textile is composed of a plurality of layers of flat structures, wherein at least one of the layers has a ceramic coating on at least one side applied by plasma spray coating.

DE 4407180 C1 discloses a stab-resistant insert for a protective vest comprising a ballistic protective packet. The stab-resistant insert is composed of a steel chain network embedded in a flexible plastic matrix.

Furthermore, DE 19802242 A1 discloses a protective textile for protection against stab and/or bullet wounds composed of a plurality of layers of flat structures of high-strength materials, wherein more than one of the layers is coated with a hard substance layer.

A composite structure with a leather substrate and a textile substrate is described in WO 2012/166624 A1. Projecting hardened polymer plates are present on the surface of the textile substrate.

A body protector in the form of a protective jacket is known from DE 4214543 A1. A plurality of overlapping and partly shiftable stab-resistant, plate-shaped stab-protection members are provided in the protective jacket. A bullet-proof protective lining is provided under the stab-protection members, and a shock absorber is provided under the bullet-proof lining.

A stab-resistant fabric is known from DE 19819737 A1. The fabric is composed of a plurality of interconnected scales that overlap one another like a tiled roof, the scales having bore holes for connection to one another into which connecting elements are inserted.

DE 19833816 A1 discloses a flexible protective surface for use in personal protection. The protective surface is composed of moveable connected protective elements, wherein each protective element both has other elements partially projecting beyond or covering it and partially projects beyond or covers other elements.

The subject matter of DE 20007820 U1 is a protective vest suitable for both ballistic and stab protection. The protective vest is composed of a ballistic protective packet and a stab-resistant element positioned in front of the structure and can be separated therefrom. The stab-resistant element itself is composed of a ring mesh that is disposed between two layers of a textile flat structure.

In some cases, the known stab protection has the drawback that excessive thickness of the stab-poof component can impair the functionality of objects into which the stab protection is to be incorporated. For example, excessively thick stab protection for protective textiles can make it difficult or even impossible to adapt to body structures and in particular to achieve sufficient wearing comfort. A further disadvantage is that generic stab protection involves a certain risk that the protective element will fail to protect the wearer from stab wounds. For example, there is a risk that the structural elements provided for stab protection will give way on contact with a sharp object such as a needle or a syringe needle, allowing the sharp object to penetrate into deeper layers of the stab-resistant element, and possibly even to pass through it.

It could therefore be helpful to provide stab protection that provides stab protection with the least possible total thickness and nevertheless to ensure sufficient protection from stab wounds.

It could also be helpful to provide a method of producing a stab-resistant structure, a stab-resistant insert and a protective textile.

SUMMARY

We provide a composite structure for stab protection, in particular in the form of a stab-resistant insert.

The composite structure comprises layers of flat structures placed on top of one another and an embedding material.

In at least some of the layers placed on top of one another, the flat structures of adjacent layers are offset relative to one another. In other words, in at least some of the layers placed on top of each other, the flat structures of one layer are offset relative to at least one adjacent layer, i.e. an underlying layer and/or an overlying layer.

As a rule, therefore, the composite structure can also comprise layers of flat structures placed on top of one another and not offset relative to one another.

However, it is preferred from the standpoint of stab protection for the composite structure to comprise only layers of flat structures that are offset relative to one another. In other words, it is preferred for the flat structures of adjacent layers to be offset relative to one another.

The flat structures of the composite structure or the layers of flat structures are at least partially, and preferably completely embedded in the embedding material.

The term "composite structure" preferably refers to a structure of two or more interconnected materials or substructures. The composite structure comprises as materials or substructures at least flat structures, in particular a multilayer assembly based on flat structures, and an embedding material.

The term "stab protection" refers to protection from wounds caused by sharp objects, in particular needles or needle-shaped objects such as medical cannulas.

The term "stab-resistant insert" refers to an insert for other objects, in particular textiles, preferably protective textiles such as in particular protective gloves, for the purposes of stab protection.

The term "embedding material" refers to a material designed such that in a preferably non-solidified state, in particular in a liquified, preferably molten state, it allows at least partial, and preferably complete embedding of the flat structures or layers of the flat structures.

In other words, the composite structure is characterized in particular by comprising a multilayer assembly of flat structures at least partially embedded in an embedding material.

The function of the flat structures lies (primarily) in ensuring stab protection. The flat structures can therefore also be referred to as flat stab-resistant elements.

A multilayer assembly of flat structures provides the possibility of sufficient stab protection, and at the same time the possibility of achieving a composite structure of low total thickness. In protective textiles such as protective gloves in particular, the low total thickness results in improved adaptation to body structures such as the hands, thus simultaneously improving functionality such as the wearer's ability to grasp objects, and wearing comfort.

An assembly of layers offset relative to one another provides the additional advantage of allowing open areas, in particular openings, and preferably gaps, between adjacent flat structures of a layer to be covered by flat structures of an underlying and/or overlying layer. This makes it possible, in practical terms, to at least rule out complete penetration of the composite structure by a sharp object such as a needle or a syringe needle. This contributes to a substantial improvement in stab protection.

The embedding material provides cohesiveness of the composite structure in a particularly advantageous manner and additionally imparts to it a certain degree of flexibility, and in particular softness, thus further improving the functionality and the wearing comfort of the composite structure. Moreover, penetration of a sharp object such as a needle or a syringe needle into the composite structure is made more difficult by the embedding material because the embedding material makes it necessary to apply a higher degree of partial or complete penetrating force to cause a sharp object to partially or completely penetrate the composite. The embedding material therefore also contributes to the stab protection function of the composite structure.

Preferably, the respective flat structures are defined by a length, a width and a thickness (height).

The respective flat structures may be of greater length than thickness.

The flat structures may have a length of 0.25 mm to 10 mm, in particular 0.5 mm to 5 mm, and preferably 1 mm to 3 mm.

The respective flat structures may be of greater width than thickness.

The respective flat structures may be of greater length than width.

Alternatively, the respective flat structures are of equal length and width.

The flat structures may have a width of 0.25 mm to 10 mm, in particular 0.5 mm to 5 mm, and preferably 1 mm to 3 mm.

The respective flat structures may have a length and width both greater than the thickness of the flat structures.

The respective flat structures may have a plate-shaped, and particularly cuboidal configuration. A plate shaped, and particularly cuboidal configuration of the flat structures is particularly advantageous from the standpoint of stab protection.

The respective flat structures may be prismatic in shape. In other words, the respective flat structures may be in the shape of a prism. For example, the bottom and top surfaces of the prisms may also have triangular, quadrangular, quadratic, rectangular, parallelogram-shaped, pentagonal, hexagonal, heptagonal, octagonal, nonagonal, or decagonal peripheries. In principal, other polygonal peripheries of the prisms are also possible.

The respective flat structures may be configured to be cylindrical, in particular circularly cylindrical.

The respective flat structures may be larger in diameter than in thickness.

The composite structure may comprise 2 to 10, in particular 2 to 4 layers of flat structures placed on top of one another.

From the standpoint of stab protection, it may be sufficient if the composite structure comprises only two layers of flat structures placed on top of one another. Therefore, the composite structure may comprise only two layers of flat structures arranged on top of each other and offset relative to each other.

The adjacent flat structures within a layer may be separated from one another by openings, in particular gaps.

The respective flat structures of adjacent layers may be offset relative to one another in the length direction of the flat structures and/or the width direction of the flat structures, and preferably in the length direction of the flat structures and the width direction of the flat structures. This allows open areas, in particular openings, and preferably gaps, between flat structures within a layer to be at least partially, and preferably completely covered by flat structures of an underlying and/or overlying layer. Stab protection can thus be further improved.

As a rule, the flat structures of adjacent layers in the length direction of the flat structures and the width direction of the flat structures can show a different offset.

However, it is preferred if the respective flat structures of adjacent layers have the same offset in the length direction of the flat structures and the width direction of the flat structures. This also makes it possible to arrange individual layers rotated by 90° relative to one another.

The composite structure may comprise an alternating succession of layers, in which layers whose flat structures have an offset in a length direction of the flat structures and/or a width direction of the flat structures alternate with layers whose flat structures have an offset, in particular the same offset, in the opposite length direction of the flat structures and/or the opposite width direction of the flat structures. This allows the stab protection to be further improved.

The flat structures within a layer may be arranged without an offset relative to one another.

The flat structures of adjacent layers may be at a distance of 0.025 mm to 2 mm, in particular 0.05 mm to 1 mm, and preferably 0.1 mm to 0.5 mm from one another.

Adjacent flat structures within a layer may be at a distance, preferably a clear distance, of 0.05 mm to 5 mm, in particular 0.1 mm to 2 mm, and preferably 0.5 mm to 1 mm from one another.

The flat structures within a layer may be arranged with no distance among them.

The respective flat structures of the composite structure or the layers of the flat structures placed on top of one another may be completely embedded in the embedding material, i.e., the respective surfaces of all flat structures of the composite structure are preferably completely covered by the embedding material.

The respective flat structures may be composed of a hard material.

Preferably, the respective flat structures are composed of a material harder than the embedding material.

For example, the material of the flat structures can have a Mohs hardness (hardness determination method according to Mohs; unit: Mohs; 10-stage scratch hardness scale) of 3 to 10, and in particular 5 to 7.

The flat structures may comprise or may be composed of a material selected from the group composed of metal, sheet metal, a polymer, in particular plastic, ceramic materials, quartz and combinations, in particular composite materials or composites, of two or more of the above-mentioned materials.

The metal can be selected from the group composed of light metals such as aluminum, titanium, steel and combinations, in particular alloys, thereof.

Furthermore, the metal can be a hard metal composed in particular of 90 to 94% tungsten carbide and 6 to 10% cobalt.

The polymer can be selected from the group composed of a polyamide, in particular an aramid, a high-strength polyolefin, an elastic polymer and combinations, in particular blends or composite materials (or composites), of two or more of the above-mentioned polymers.

The elastic polymer can be selected from the group composed of epoxy resin, polyurethane, silicone, siloxane, rubber and combinations, in particular blends or composite materials (or composites), of two or more of the above-mentioned polymers.

The ceramic material can be selected from the group composed of silicate ceramics, oxide ceramics, non-oxide ceramics and combinations, in particular composite materials or composites, of two or more of the above-mentioned ceramics. To produce the ceramic material, for example, one can use raw materials selected from the group composed of aluminum oxide, zirconium oxide, calcium oxide, magnesium oxide, titanium dioxide, silicon dioxide, aluminum silicate, calcium silicate, magnesium silicate, silicon carbide, zirconium carbide and combinations of two or more of the above-mentioned raw materials.

As a rule, the flat structures can be textile flat structures and/or non-textile flat structures. However, it is preferred if the respective flat structures are non-textile flat structures, in particular flat structures with continuous closed surfaces, i.e. without openings, gaps, cracks, perforation or the like. This makes it possible to further improve stab protection.

The respective flat structures may be solid flat structures, i.e. flat structures without hollow spaces.

The surfaces of the respective flat structures may be configured to be flat, i.e. without elevations or recesses.

The surfaces of the respective flat structures may be configured to be straight.

The respective flat structures may have a uniform thickness, i.e. a thickness that is constant throughout.

The respective flat structures may have a thickness of 0.025 mm to 2 mm, in particular 0.05 mm to 1 mm, and preferably 0.1 mm to 0.5 mm. In particular, the above mentioned thicknesses are advantageous in that on the one hand, they ensure sufficient stab protection, but on the other, they allow a composite structure with a low total thickness to be obtained.

The flat structures of the layers placed on top of one another may have differing configurations. For example, the flat structures of the layers placed on top of one another can differ from one another with respect to their dimensions, for example, with respect to their length, width and/or thickness or with respect to their diameter and/or thickness, with respect to an offset, with respect to their materials and/or with respect to their shape or form.

Advantageously from the standpoint of stability, flat structures, in particular adjacent flat structures within a layer and/or flat structures of adjacent layers, are connected to one another via connecting elements, in particular connected to one another in a movable manner.

The connecting elements can further have a thickness of 0.01 mm to 1 mm, in particular 0.02 mm to 0.5 mm, and preferably 0.04 mm to 0.1 mm.

Moreover, the connecting elements can have a round or non-round, in particular a polygonal cross section. For example, the connecting elements can have a quadrangular, in particular a rectangular or quadratic cross section.

In particular, flat structures of adjacent layers can connect to one another via connecting elements that project perpendicularly or at an acute angle, i.e. at an angle of less than 90°, from the surfaces of the connected flat structures. It is preferred if the connecting elements project at an acute angle from the surfaces of the flat structures connected to one another. This allows the individual layers of the flat structures to be better pressed together when subjected to pressure, in particular on contact with a sharp object such as a needle or a syringe needle. This improves the flexibility of the composite structure.

The composite structure may comprise separated, in particular ruptured connecting elements. Before being separated, in particular ruptured, the separated, in particular ruptured connecting elements have preferably connected at least some of the flat structures, in particular at least some of the flat structures within a layer and/or at least some of the flat structures of adjacent layers, to one another. The composite structure thus comprises preferably separated, in particular ruptured connecting elements whose free ends point in the direction of adjacent flat structures within a layer and/or in the direction of structures of adjacent layers. In particular, the connecting structure can have exclusively separated, in particular ruptured connecting elements which, before being separated, in particular ruptured, have connected flat structures of adjacent layers to one another. The flexibility of the composite structure can be further increased in a particularly advantageous manner by separating the connecting elements.

Furthermore, the composite structure can comprise both separated, in particular ruptured connecting elements and intact connecting elements, i.e. connecting elements that connect flat structures, in particular adjacent flat structures within a layer and/or flat structures of adjacent layers, to one another. However, it can also be provided that the composite structure comprises exclusively separated, in particular ruptured connecting elements.

The connecting elements may be elongated, in particular web-shaped connecting elements, i.e. so-called connecting webs. Accordingly, the above-mentioned separated connecting elements may be separated elongated connecting elements, in particular separated web-like connecting elements, i.e. so-called separated connecting webs.

As a rule, the connecting elements can comprise or be composed of the same material as the flat structures. Alternatively, connecting elements can comprise or be composed of a material different from the flat structures. With respect to the material, to avoid repetition, reference is made to the materials described in connection with the flat structures in their entirety. The connecting elements can thus comprise one or a plurality of the materials mentioned in this connection or be composed of one or a plurality of the materials mentioned in this connection.

The flat structures or the layers of flat structures placed on top of one another and/or optionally provided connecting elements, in particular as described in the above examples, may be produced by a generative production method or additive production (rapid prototyping). This refers to a method for the rapid and inexpensive production of models, patterns, prototypes, tools and end products. This production is carried out directly based on computer-internal data models from shapeless material (liquids, powder and the like) or shape-neutral (band or wire-shaped) material by chemical and/or physical processes. Although these are primary forming methods, no special tools that have stored the respective geometry of the workpiece are required to obtain a concrete result.

As a rule, the generative production method can be a powder bed method, free space method, liquid material method or another layer construction method.

The powder bed method can be selected from the group composed of selective laser melting, selective laser sintering, selective heat sintering, hardening of powder materials using a binder (binder jetting) and electron beam melting.

The free space method can be selected from the group composed of melt coating (fused deposition modelling), the LOM (laminated object modelling) method, cladding, wax deposition modelling, contour grafting, cold gas spraying and electron beam melting.

The liquid material method can be selected from the group composed of stereolithography, the DLP (digital light processing) method and the LCM method. The LCM method can be a liquid composite molding method or a lithography-based ceramic manufacturing method.

The use of generative production methods to produce the flat structures or layers of flat structures placed on top of one another is particularly advantageous in that this allows flat structures to be achieved with an extremely thin configuration and a sufficient stab protection function, in particular multilayer assemblies of flat structures cohesively connected via connecting elements having extremely low total thickness. This contributes substantially toward producing a composite structure with extremely low overall thickness effective from the standpoint of stab protection. A further advantage of generative production methods is that there are virtually no limitations with respect to the materials used such as, for example, with respect to metals and/or plastics.

Particularly preferably, the flat structures or the layers of flat structures placed on top of one another and/or optionally provided connecting elements, in particular as described in preceding examples, are produced by laser sintering or laser melting.

Alternatively, the flat structures or the layers of flat structures placed on top of one another are produced by working, in particular by sheet metal working.

Alternatively, the flat structures or the layers of flat structures placed on top of one another are produced by laser beam or water jet cutting. This makes it possible, for example, starting from large-area substrates, to produce layer-like assemblies of flat structures by making perforations, wherein the flat structures connect to one another via connecting elements, in particular web-like connecting elements, i.e. so-called connecting webs.

The flat structures or the layers of flat structures placed on top of one another may be produced by polymer deposition in combination with a ceramization process. In this example, the flat structures are produced from a polymer, wherein the organic components are driven out or converted in a subsequent ceramization process in the absence of oxygen and at elevated temperature, wherein flat structures are obtained from a finely structured ceramic.

As a rule, the embedding material can be a textile embedding material or a non-textile embedding material. It is preferred if the embedding material is a non-textile embedding material.

The embedding material may be an embedding matrix.

For example, the embedding material is in solidified, in particular cured form. In other words, the embedding material is a solidified, in particular cured embedding material.

The embedding material is preferably a flexible, in particular an elastic embedding material.

Furthermore, the embedding material is preferably a soft embedding material.

The embedding material may comprise material, in particular a polymer, or may be composed of a material, in particular a polymer, selected from the group composed of a polysiloxane such as polyorganosiloxane, an elastomer, a thermoplastic elastomer, a rubber, a polyurethane or combinations, in particular blends or composite materials (or composites), of two or more of the above-mentioned materials, in particular polymers.

The thermoplastic elastomer can be a thermoplastic copolyamide or an elastomeric alloy. The term "thermoplastic copolyamide" refers to a thermoplastic polyamide comprising at least two different amide units (as monomer units). The term "elastomeric alloy" refers to a polyblend, i.e. an admixture (blend) of finished elastomers.

The thermoplastic elastomer can be selected from the group composed of a thermoplastic copolyamide, a thermoplastic polyester elastomer, an olefin-based thermoplastic elastomer, a styrene block copolymer, a urethane-based thermoplastic elastomer, an olefin-based crosslinked thermoplastic elastomer and combinations, in particular copolymers, blends or composite materials (or composites), of two or more of the above-mentioned thermoplastic elastomers.

For example, the thermoplastic elastomer can be selected from the group composed of polyether block amide block copolymer (commercially available, for example, under the brand name Pebax® TPE-A), natural rubber (cis-1,4-polyisoprene), synthetic rubber, polybutadiene rubber, styrene-butadiene rubber, ethylene-propylene rubber, ethylene vinyl acetate rubber, ethylene-propylene-diene rubber (EPDM), butyl rubber, nitrile rubber, chloroprene rubber, silicone rubber, styrene-butadiene block copolymers, acrylonitrile-butadiene-styrene copolymers, styrene-acrylonitrile copolymers, styrene-butadiene graft copolymers, styrene-butadiene elastomer, silicone copolymers and combinations, in particular copolymers, blends or composite materials (or composites), of two or more of the above-mentioned polymers.

The composite structure may have a total thickness of 0.1 mm to 6 mm, in particular 0.4 mm to 3 mm, and preferably 0.6 mm to 1.2 mm. In particular, the total thicknesses disclosed above are advantageous in that they cause virtually no impairment of the desired functionality of objects such as in particular protective textiles, preferably protective clothing, into which the composite structure, in particular in the form of a stab-resistant insert, can be inserted. In protective clothing, a further advantage is that in particular the total thicknesses described above do not impair, or at least do not significantly impair, wearing comfort.

The composite structure may be a stab-resistant insert, in particular for a protective textile, preferably for protective gloves.

The composite structure can also comprise features of combinations of the above-described examples.

We further provide a method of producing a composite structure for stab protection, in particular a composite structure as described in the above examples.

The method comprises the following steps:
a) production of layers of flat structures,
b) embedding the layers of flat structures in a not-yet-hardened embedding material and
c) hardening of the embedding material.

Preferably, step a) is carried out by a generative production method, in particular by laser sintering or laser melting. With respect to further features and advantages of the generative production method, reference is made to the above description in its entirety. The features and advantages of the generative production method discussed herein also apply mutatis mutandis to the method.

In step a), an assembly of a plurality of layers of flat structures placed on top of one another may be produced, wherein preferably at least some of the layers are offset relative to one another.

In step a), an assembly of a plurality of layers of flat structures placed on top of one another is preferably produced, wherein the respective adjacent layers are offset relative to one another.

To produce the assembly, flat structures, in particular adjacent flat structures within a layer and/or flat structures of adjacent layers, may be connected to one another via connecting elements, in particular elongated connecting elements, preferably web-like connecting elements, i.e. so-called connecting webs.

In particular, to produce the assembly, exclusively flat structures of adjacent layers can connect to one another via connecting elements, in particular elongated connecting elements, preferably web-like connecting elements, i.e. so-called connecting webs.

The connecting elements may be separated, in particular ruptured, after step b), and preferably after step c). Preferably, the connecting elements are mechanically separated, in particular by calendering or deflection on a roller.

The layers, in particular in the form of individual layers (so-called individual plies), may be produced in step a) by laser or water jet cutting. In step b), the layers are then embedded in the embedding material successively or one after the other.

Alternatively, the layers, in particular in the form of individual layers (so-called single plies), are produced in step a) by polymer deposition in combination with a ceramization process.

In step b), a liquid or liquefied material, in particular molten embedding material may be used.

In step b), the layers may be successively embedded in the embedding material, i.e. one after the other.

In step b), at least some of the layers may be embedded in the embedding material offset relative to one another. Preferably, in step b) the respective layers are embedded in the embedding material offset relative to one another.

As a rule, in step b), the layers can only be partially or completely embedded in the embedding material. Preferably, in step b), the layers are completely embedded in the embedding material.

In step b), the layers may be embedded in the embedding material by coating, in particular doctor blade coating.

The embedding material may be solidified in step c) by cooling.

Alternatively, the embedding material may be solidified in step c) by curing, for example, evaporation of a solvent or solvent mixture or addition of a crosslinking agent.

Of course, the method can also comprise features of combinations of the above-described examples.

With respect to further features and advantages of the method, reference is made to the above description in its entirety. The features and advantages described therein, particularly with respect to the composite structure, the layers of the flat structures, the flat structures, the embedding material and optionally provided connecting elements also apply mutatis mutandis to the method.

We further provide a stab-resistant insert. The stab-resistant insert comprises a composite structure or is composed of such a composite structure.

With respect to further features and advantages of the stab-resistant insert, reference is also made to the above description in its entirety. The features and advantages described therein, particularly with respect to the composite structure, the layers of the flat structures, the flat structures, the embedding material and optionally provided connecting elements also apply mutatis mutandis to the stab-resistant insert.

We further provide a protective textile. The protective textile comprises a composite structure.

Preferably, the protective textile is a protective garment. As a rule, the protective garment can be a protective suit, a protective vest or protective gloves. It is preferred for the protective garment to be protective gloves.

Particularly preferably, the protective textile is a stab-resistant garment, in particular stab-resistant gloves.

With respect to further features and advantages of the protective textile, reference is also made to the above description in its entirety. The features and advantages described therein, particularly with respect to the composite structure, the layers of the flat structures, the flat structures, the embedding material and optionally provided connecting elements also apply mutatis mutandis to the protective textile.

We further provide for the use of a composite structure as a stab-resistant insert, in particular for a protective textile, preferably for protective clothing, particularly preferably for protective gloves, in particular stab-resistant gloves, or producing a protective textile, in particular protective clothing, preferably protective gloves, and in particular stab-resistant gloves.

With respect to further features and advantages of use, reference is also made to the above description in its entirety. The features and advantages described therein, particularly with respect to the composite structure, the layers of the flat structures, the flat structures, the embedding material and optionally provided connecting elements, the protective textile and the protective clothing also apply mutatis mutandis to the use.

Further features and advantages are found in the following description of preferred examples, figures and the accompanying descriptions of the figures. Here, individual features can be implemented individually or in combination with one another. The examples described in the following serve only to further explain this disclosure, which is not limited thereto.

DETAILED DESCRIPTION

Figure 1:
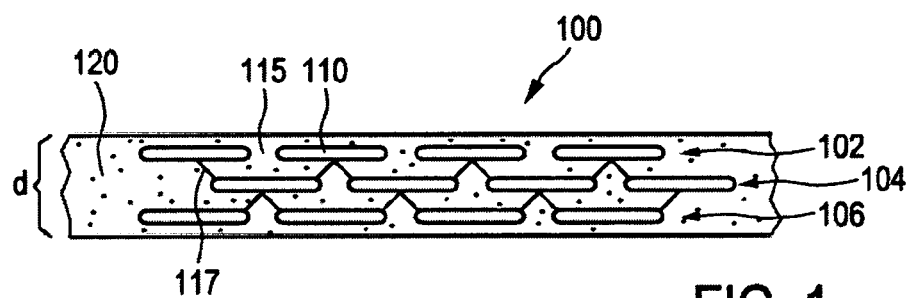
FIG. 1 diagrammatically shows a side view of an example of a composite structure.

FIG. 1 is a diagrammatic side view of a composite structure 100.

The composite structure 100 comprises layers of flat structures 110 placed on top of one another. For example, as shown in FIG. 1, the composite structure 100 can comprise three layers 102; 104; 106 of flat structures 110 placed on top of one another. However, a composite structure can also comprise more than three layers of flat structures placed on top of one another. As mentioned above, it can even be sufficient for suitable stab protection if the composite structure comprises only two layers of flat structures placed on top of one another.

The respective flat structures 110 have a length and width greater than the thickness of the flat structures 110. The flat structures 110 preferably have a plate-shaped configuration. This configuration makes effective stab protection possible.

Furthermore, the respective flat structures 110 of adjacent layers are offset relative to one another. By the offset assembly of the layers 102; 104; 106, openings, in particular gaps 115 between adjacent flat structures 110 of a layer 104 can be covered in a particularly advantageous manner by the flat structures 110 of an underlying layer 106 and/or an overlying layer 102. This further increases stab resistance.

The composite structure shown in FIG. 1 comprises an alternating succession of layers, wherein two layers 102; 106 comprise flat structures 110 with an offset in a length direction of the flat structures 110 and/or a width direction of the flat structures 110 and an interspersed layer 104 of flat structures 110 with an offset, in particular the same offset, in the opposite length direction of the flat structures 110 of the layers 102; 106 and/or in the opposite width direction of the flat structures 110 of the layers 102; 106.

Moreover, the flat structures 110 of adjacent layers can connect to one another via connecting webs 117. From the standpoint of flexibility, it can be advantageous if the connecting webs 117 project at an acute angle from the surfaces of the connected flat structures 110.

The flat structures 110 or the multilayer assembly of flat structures 110 held together via the connecting webs 117 is/are preferably produced by a generative production method, in particular by laser sintering or laser melting. The advantage of generative production methods is that they allow flat structures 110 to be produced in a particularly thin configuration, in particular with a thickness of 50 μm to 100 μm. This in turn makes it possible to produce a composite structure with an extremely thin total thickness d. For example, composite structures with a total thickness of 1 mm or less can be produced by generative production methods.

In the example of a composite structure 100 shown in FIG. 1, the flat structures 110 are completely embedded in an embedding material 120.

As a result, the embedding material 120 constitutes an embedding matrix for the flat structures 110.

The embedding material 120 provides cohesion and flexibility of the composite structure 100. Moreover, the embedding material 120 makes it more difficult to completely penetrate the composite structure 100 with a sharp object such as a needle or a syringe needle.

Figure 2:
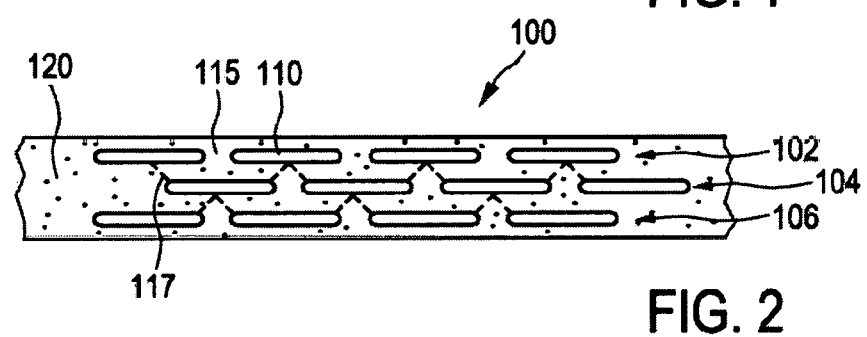
FIG. 2 diagrammatically shows a side view of a further example of a composite structure.

FIG. 2 is a diagrammatic side view of a further example of a composite structure 100. The composite structure 100 differs from the example shown in FIG. 1 in that the connecting elements 117 have been separated to increase flexibility of the composite structure 100, in particular mechanically, for example, by calendering.

Figure 3:
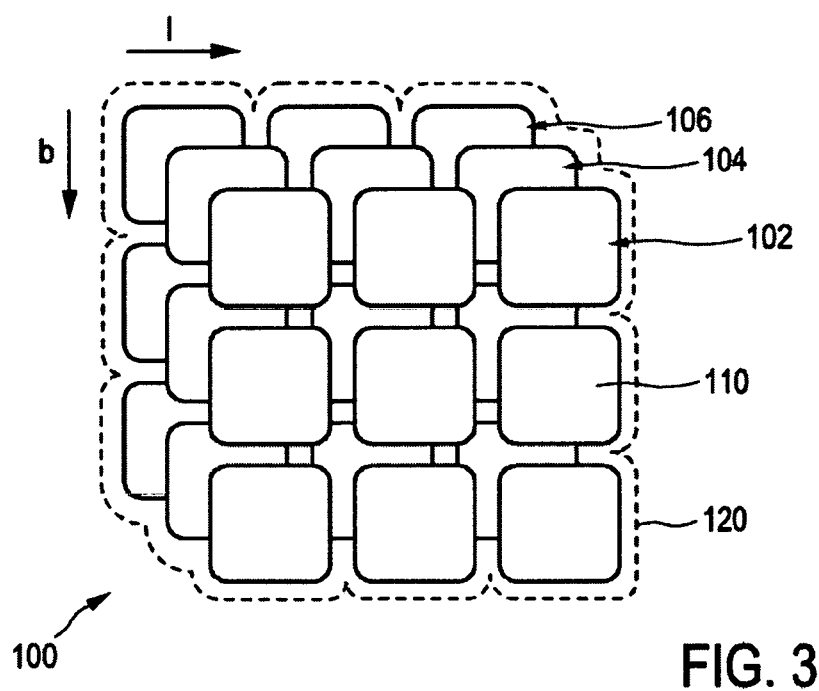
FIG. 3 diagrammatically shows a top view of a further example of a composite structure.

FIG. 3 is a diagrammatic top view of a further example of a composite structure 100.

The composite structure 100 shown comprises three layers 102, 104; 106 of flat structures 110 placed on top of one another. The flat structures 110 of adjacent layers are offset relative to one another.

In the example of a composite structure 100 shown in FIG. 3, the respective flat structures 110 of adjacent layers have an offset, in particular an equal offset in the length direction of the flat structures 110 (shown by an arrow with the letter "l") and the width direction of the flat structures 110 (shown by an arrow with the letter "b").

The respective flat structures 110 or the layers 102; 104; 106 of the flat structures 110 are also completely embedded in an embedding material 120.

With respect to further features and advantages of the composite structure 100, reference is made to the description of the composite structure 100 shown in FIG. 1 in its entirety. The features and advantages described therein apply mutatis mutandis to the composite structure 100 shown in FIG. 3.

The respective composite structures shown in FIGS. 1 through 3 are preferably in the form of a stab-resistant insert.

EXAMPLE

To produce a composite structure for stab protection, an assembly of flat structures was produced, which was then embedded in a silicone rubber.

The flat structures were composed of steel and had the following dimensions:

Length×width: 2 mm×2 mm; thickness 0.1 mm.

The assembly of the flat structures was composed of three layers with a vertical distance of 0.3 mm from the center of one flat structure to the center of the next. The flat structures of the layer had a clearance of 0.5 mm in the x and y direction. The flat structures of the adjacent layers showed an offset of 0.75 mm in the x direction and 0.75 mm in the y direction. The respective flat structures of one layer were connected to one of the flat structures of the adjacent layer via a web having a square cross section and an edge length of 0.05 mm. The flat structures of the uppermost layer were connected via connecting webs to two further adjacent flat structures of the underlying layer. The position of the flat structures relative to one another is fixed in the composite structure by the assembly of webs. The edges of the flat structures and connecting webs showed production-related radii and surface quality.

The assembly of the flat structures and the webs was then embedded in a silicone rubber (Wacker Chemie AG ELASTOSIL LR 3003, component A/B mixing ratio 1:1 and 5% crosslinker W, also Wacker Chemie AG) by a doctor blade coating method. The silicone rubber was vulcanized for approx. 5 minutes at 165° C. Embedding was carried out such that the structure was covered with silicone rubber from both sides with a thickness of approx. 0.15 mm. For this purpose, a layer of silicone rubber was first applied with a doctor blade in a thickness of 0.15 mm and pre-crosslinked (approx. 2 minutes, 100° C.), the structure was inserted, and the structure was then filled and covered in a further coating step with a doctor blade gap width of 1 mm.

The composite structure obtained had a total thickness of approx. 1 mm.

The invention claimed is:

1. A stab-resistant composite structure, comprising
layers of flat structures vertically stacked on top of each other, and
an embedding material,
wherein, in at least some of the layers vertically stacked on top of each other the flat structures of adjacent layers are offset relative to one another, wherein the flat structures of the composite structure are embedded in the embedding material, and the composite structure comprises ruptured connecting elements, wherein the ruptured connecting elements are formed by defining connecting elements vertically connecting at least some of the flat structures of adjacent layers with one another and rupturing the connecting elements following embedding the flat structures of adjacent layers in the embedding material.

2. The composite structure as claimed in claim 1, wherein the respective surfaces of the flat structures are configured to be flat, without elevations or recesses, and are straight.

3. The composite structure as claimed in claim 1, wherein the respective flat structures have a uniform thickness.

4. The composite structure as claimed in claim 1, wherein the respective flat structures have a thickness of 0.025 mm to 2 mm.

5. The composite structure as claimed in claim 1, wherein the respective flat structures are of greater length than thickness.

6. The composite structure as claimed in claim 1, wherein the respective flat structures have a length of 0.25 mm to 10 mm.

7. The composite structure as claimed in claim 1, wherein the respective flat structures are of greater width than thickness.

8. The composite structure as claimed in claim 1, wherein the respective flat structures have a width of 0.25 mm to 10 mm.

9. The composite structure as claimed in claim 1, wherein the respective flat structures have a plate-shaped, or a cuboidal configuration.

10. The composite structure as claimed in claim 1, wherein the respective flat structures of adjacent layers are offset relative to one another in the length direction and the width direction of the flat structures, and, optionally, have the same offset in the length direction and the width direction of the flat structures.

11. The composite structure as claimed in claim 1, wherein the respective flat structures are composed of a material harder than the embedding material.

12. The composite structure as claimed in claim 1, wherein the flat structures comprise or are composed of a material selected from the group consisting of metal, sheet metal, a polymer, a plastic, a ceramic material, quartz, composite materials and combinations thereof.

13. The composite structure as claimed in claim 1, wherein the embedding material is a flexible or an elastic embedding material.

14. The composite structure as claimed in claim 1, wherein the embedding material comprises or is composed of a material selected from the group consisting of polysiloxane, polyorganosiloxane, a thermoplastic elastomer, rubber, ethylene-propylene-diene rubber (EPDM), polyurethane, blends or composite materials thereof.

15. The composite structure as claimed in claim 1, wherein the composite structure has a total thickness of 0.1 mm to 6 mm.

16. The composite structure as claimed in claim 1, wherein the flat structures or the layers of flat structures placed on top of one another are produced by a generative production method, laser sintering or laser melting.

17. A method of producing the composite structure as claimed in claim 1, comprising steps of:
a) producing the layers of flat structures;
b) embedding the layers of flat structures in a not-yet-hardened embedding material;
c) hardening the embedding material,
wherein, in step a), an assembly of the plurality of layers of flat structures vertically-stacked on top of each other is formed, wherein the flat structures of adjacent layers are offset relative to one another and vertically connected to one another via connecting elements, and the connecting elements are ruptured after step c) is carried out.

18. The method as claimed in claim 17, wherein the connecting elements are mechanically separated by calendering or deflection on a roller.

19. The method as claimed in claim 17, wherein step a) is carried out by a generative production method, laser sintering or laser melting.

20. The method as claimed in claim 17, wherein, in step a), the layers are produced by laser or water jet cutting.

21. A stab-resistant insert, comprising the composite structure as claimed in claim 1.

22. A protective textile, comprising the composite structure as claimed in claim 1.

23. A protective glove comprising the protective textile according to claim 22.

* * * * *